United States Patent [19]
Propst et al.

[11] Patent Number: 5,425,983
[45] Date of Patent: Jun. 20, 1995

[54] INFRARED WINDOW PROTECTED BY MULTILAYER ANTIREFLECTIVE COATING

[75] Inventors: Stephen H. Propst, Santa Ynez; Cathy M. Peterson, Santa Barbara, both of Calif.

[73] Assignee: Santa Barbara Research Center, Goleta, Calif.

[21] Appl. No.: 927,682

[22] Filed: Aug. 10, 1992

[51] Int. Cl.⁶ .............................................. B21D 39/00
[52] U.S. Cl. .................................. 428/216; 428/212; 428/446; 428/408; 428/469
[58] Field of Search ............... 428/216, 408, 446, 212, 428/469

[56] References Cited

U.S. PATENT DOCUMENTS

| | | | |
|---|---|---|---|
| 4,383,728 | 5/1983 | Litington | 359/359 |
| 4,915,977 | 4/1990 | Okamoto et al. | 427/37 |
| 4,939,043 | 7/1990 | Biricik et al. | 428/336 |

FOREIGN PATENT DOCUMENTS 1-147067  6/1989  Japan .

Primary Examiner—A. A. Turner
Attorney, Agent, or Firm—W. C. Schubert; W. K. Denson-Low

[57] ABSTRACT

An infrared window (26) includes a substrate (40) made of a zinc salt composition and an antireflection coating system (42) deposited on the substrate (40). The coating system (42) comprises a first layer (44) of germanium overlying the substrate (40), a second layer (46) of diamond-like carbon overlying the first layer (44), a third layer (48) of germanium overlying the second layer (46), and a fourth layer (50) of diamond-like carbon overlying the third layer (48). Preferably, the germanium layers (44, 48) are in tension and the diamond-like carbon layers (46, 50) are in compression. The germanium layers (44, 48) are preferably deposited by magnetron sputtering and the diamond-like carbon layers (46, 50) are preferably deposited by plasma activated chemical vapor deposition. Silicon may be used in place of the germanium, and graded compositions can be used for the first layer (44) and the third layer (48).

21 Claims, 2 Drawing Sheets

INFRARED WINDOW PROTECTED BY MULTILAYER ANTIREFLECTIVE COATING

BACKGROUND OF THE INVENTION

This invention relates to windows that are transparent to infrared radiation, and, more particularly, to an antireflection, damage-resistant coating for such windows.

An infrared sensor is a device that is sensitive to radiation in the infrared range, about 8-11 micrometers wavelength. This wavelength is not visible to the human eye, but is associated with the production of heat. The sensor receives this radiation as an input and produces an electrical output that can be processed into information about the scene viewed by the sensor. Such sensors can be used in a wide variety of situations of interest. They may be passive devices that are useful at night and in other conditions that may render sensors in the visible region ineffective, do not themselves radiate energy, and are relatively light in weight.

One of the important applications of infrared sensors is in flight vehicles such as missiles and aircraft. In this application, the infrared sensor is typically fabricated as an array of individual infrared-sensitive detectors, whose outputs are processed and combined together to form an infrared image of the field of view. The sensor is usually mounted in the nose or belly of the vehicle and faces fowardly into its flight path.

The sensor formed as an array of infrared-sensitive detectors is relatively resistant to damage by shock and vibration. However, it may be easily damaged by abrasion and impact of objects against the detector elements. Abrasion causes scratching of the surface, and predominates during low-speed flight. When the sensor faces fowardly and moves at speeds of hundreds of miles per hour, the impact of almost any object may fracture the sensor. For example, dust particles in the air, particularly near the surface of the earth, and even rain drops can act as projectiles that pit or fracture the surface of the sensor.

To alleviate this problem, the infrared sensor is protected by a window through which it receives the infrared radiation. The window must be highly transparent to the infrared radiation wavelengths of interest, must itself be resistant to abrasion and damage by particles in the air, and must retain its structural integrity. The window must also be capable of withstanding the temperatures to which it is subjected during flight. When the vehicle flies slowly, as in the case of a helicopter, the window remains relatively cool. When the vehicle flies faster, as in the case of a missle or jet aircraft, the window is heated by aerodynamic heating and may reach temperatures of as much as 150 C.-300 C.

Most infrared-transparent materials used to fabricate the windows are semiconductors, as certain members of this class offer the greatest transmission of infrared radiation. Germanium windows are preferred for use at temperatures below about 100 C. However, the transmittance of germanium is reduced at higher temperatures, due to its intrinsic semiconductor nature.

Other window materials have been identified for use at higher temperatures. At the present time, a zinc salt-based structure is preferred for use in high-temperature infrared windows. The zinc salt structure, typically a layered structure of zinc sulfide and zinc selenide, is fabricated into a window (or dome) form and placed over the sensor. This window has good infrared transmission in the 8-11 micrometer infrared wavelength range at temperatures over 100 C., and up to as much as 150 C.-300 C.

The zinc-salt window is, however, sensitive to abrasion damage and impact damage by dust, sand, other particles, and rain droplets. It must therefore be protected by a hardened exterior surface coating. The coating materials are typically less transparent to infrared radiation than the zinc salts and therefore cannot be used for the entire window construction. The coating is applied as a thin layer so that its total attenuation of the infrared energy is acceptably low.

In one prior approach, diamond-like carbon is applied to the outer surface of the zinc-salt window as a protective coating. Diamond-like carbon is hard and damage resistant, and infrared transparent. However, the diamond-like carbon does not adhere well to the surface of the window when applied in a sufficient thickness to be useful for most missions. There is a tendency for the protective coating to delaminate from the surface of the window during flight under impact conditions of dust or droplets, with the result that the window itself may be rendered insufficiently transparent.

There is therefore a need for an improved window that is highly infrared transparent to infrared radiation. Stated alternatively, the window must have a low reflectance of the infrared energy. The window must be resistant to damage when propelled through the air at low and high speeds. The window must also be serviceable at high temperatures of up to as much as 150 C.-300 C. The provides related advantages.

SUMMARY OF THE INVENTION

The present invention provides an infrared window including an infrared-transparent substrate that is protected by an antireflection coating system. The coating has acceptable transmission of infrared energy, and is resistant to abrasion, particle damage, and rain damage. The window and coating are operable to elevated temperatures, without loss of adhesion of the coating to the substrate.

In accordance with the invention, an infrared window comprises a substrate transparent to infrared radiation and an antireflection coating system deposited on the substrate. The antireflection coating system comprises an infrared-transparent base layer that adheres to the substrate, an infrared-transparent top layer of an abrasion-resistant material, and infrared-transparent stress-reducing layer structure means intermediate the base layer and the top layer for stress matching the top layer to the base layer and the substrate. The base layer and the stress-reducing layer structure means are selected to obtain an effective index of refraction of the substrate, the base layer, and the stress-reducing layer structure means that is about equal to the square of the index of refraction of the top layer.

More specifically, and as applied to a particular context, an infrared window comprises a substrate, and an antireflection coating system deposited on the substrate. The antireflection coating system comprises a first layer overlying the substrate, the first layer being made of a material selected from the group consisting of a germanium-including material and a silicon-including material; a second layer of diamond-like carbon overlying the first layer; a third layer overlying the second layer, the third layer being made of a material selected from the group consisting of a germanium-including material and a silicon-including material; and a fourth layer of diamond-like carbon overlying the third layer.

Even more specifically, an infrared window comprises a substrate made of a composition including a zinc salt and an antireflection coating system deposited on the substrate. The coating system comprises a first layer of germanium overlying the substrate, a second layer of diamond-like carbon overlying the first layer, a third layer of germanium overlying the second layer, and a fourth layer of diamond-like carbon overlying the third layer.

In designing an antireflection coating, there are two principal objectives: (1) achieving low reflectance and good transmission through the window over a broad band width of the radiation of interest, and (2) ensuring that the coating is protective and adherent to the substrate, and remains protective and adherent to the substrate during use. These objectives are not always in accord, and sometimes produce countervailing design considerations. The present multilayer coating structure is chosen because it achieves these objectives. First, it achieves a broad bandwidth for good infrared transmission of the window. That is, in the present approach good infrared transmission is achieved over the band width range of about 8-11 micrometers. The compositions and thicknesses of the first or base layer, the second layer, and the third layer are selected to attain a selected effective index of refraction of the combination of the substrate and these layers, so that these layers are optically matched to the fourth or top layer of abrasion-/impact-resistant material.

Second, the multilayer coating achieves good protection of the substrate against abrasion and impact damage, and has improved adhesion and adherence of the fourth or top protective layer of the abrasion-resistant material both initially and during service. The fourth layer of diamond-like carbon, preferably deposited in compression, provides the necessary abrasion and impact resistance for the coating system. However, preliminary studies showed that the fourth layer does not adhere well directly to the base layer in a range of conditions of temperature variation and impactng testing. The low adherence has been traced to the stresses present in the thin coatings upon deposition.

The intermediate stress-reducing structure of the second and third layers has therefore been introduced and designed to approximately balance and null the residual stresses in the coating as a whole. The preferred stress-reducing structure is the second layer of diamond-like carbon overlying the first layer, and the third layer of germanium overlying the second layer. The thick fourth layer of diamond-like carbon is deposited overlying the third layer. The layers are preferably deposited in alternating tension and compression, resulting in balanced, near-zero net stress in the coating. The near-zero net stress contributes to good adherence of the coating to the substrate initially and during service. This structure has been found to have excellent resistance to dust and droplet damage in high speed flight, and also to have good adherence over a range of temperatures and conditions of use. Additional pairs of stress-reducing layers may be added to the stress-reducing structure intermediate the base layer and the top layer, further contributing to the stress matching.

While this window is operable with layers of different thicknesses, optimum transmission of infrared radiation and optimum adherence are achieved with particular thicknesses of the layers. The first layer preferably has a thickness of from about 11,100 to about 18,600 Angstroms, most preferably about 12,348 Angstroms. The second layer preferably has a thickness of from about 2160 to about 2390 Angstroms, most preferably about 2278 Angstroms. The third layer preferably has a thickness of from about 10,515 to about 11,600 Angstroms, most preferably about 11,068 Angstroms. The fourth layer preferably has a thickness of from about 9,000 to about 11,000 Angstroms, most preferably about 10,010 Angstroms.

Other intermediate layers can be added, within the constraints indicated above. That is, the additional intermediate layers must aid in stress matching and optical matching of the fourth layer to the substrate.

The present invention provides an important advance in the art of infrared windows for use at elevated temperatures. The substrate/coating system of the invention is resistant to damage and retains its structural integrity over a wide range of conditions of use. Other features and advantages of the present invention will be apparent from the following more detailed description of the preferred embodiments, taken in conjunction with the accompanying drawings, which illustrate, by way of example, the principles of the invention.

DETAILED DESCRIPTION OF THE INVENTION

Figure 1:
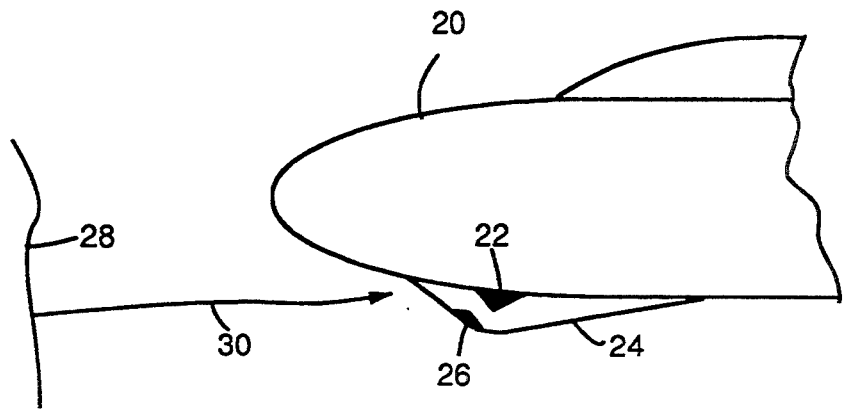
FIG. 1 is a schematic depiction of a sensor and window in an aircraft.

FIG. 1 illustrates an aircraft 20 that has a sensor 22 in a belly-mounted housing 24. The snesor 22 faces forwardly through a window 26, and views a scene 28. Infrared radiation 30 produced in the scene propagates through the window 26 to the sensor 22, where it is detected by individual detectors that comprise the sensor. The electrical output of the detectors is processed by electronic circuitry (not shown) both within the sensor and within the aircraft, and the resulting information is made available to the aircraft crew as an image of the scene 28, or otherwise.

Figure 2:
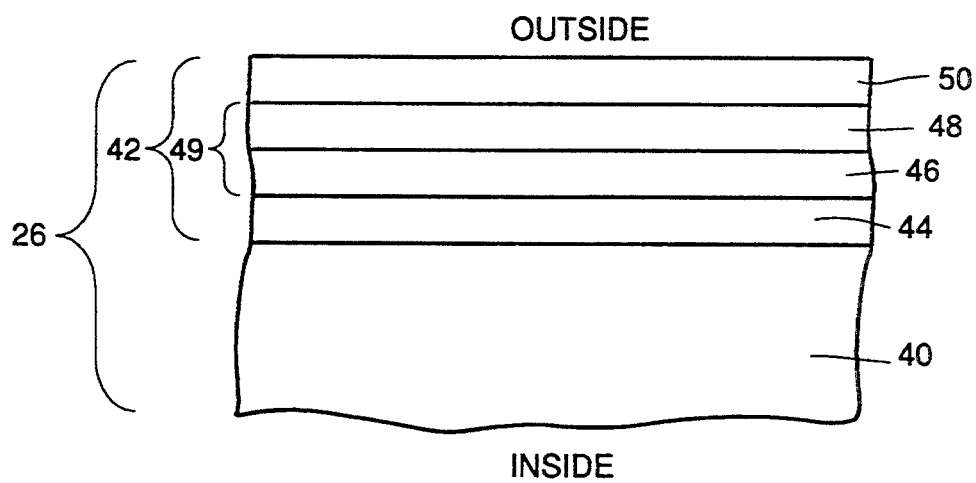
FIG. 2 is an schematic sectional view of a window according to the invention.

The present invention deals with the construction of the window 26, and a preferred form is shown in FIG. 2, which is not drawn to scale. The window 26 may be characterized as a substrate 40 with an antireflection coating system 42 deposited on the substrate 40.

The substrate 40 is a relatively thick structural member that forms a wall of the housing and physically withstands the aerodynamic forces as the aircraft 20 flies through the air. The substrate 40 is transparent to infrared radiation. The term "transparent" is used herein to indicate that a large fraction of incident radiation is transmitted, but typically that transmission is less than 100 percent. It is an objective that the entire window system, including substrate and coating, reaches a high total transmission of infrared energy while achieving good resistance to damage from impinging dust end droplets. In the present case, the window 26 must also be operable at temperatures of up to about 150 C.–300 C.

The preferred substrate material is a commercially available composition that includes a zinc-based salt such as zinc sulfide and/or zinc selenide. In a typical case, the window is formed of a layer of zinc sulfide on zinc selenide. The zinc salt is an acceptable window material for use in the required temperature range, but has low resistance to abrasion and impact damage and therefore must be protected by the coating system 42.

The coating system 42 includes four layers, at a minimum. A first layer 44 is deposited upon the substrate 40. The first layer 44 preferably is a polycrystalline germanium-including or silicon-including material. The first layer 44 may be, for example, pure germanium, an alloy based upon germanium such as Ge:C, pure silicon, an alloy based upon silicon such as Si:C, or a graded material wherein the composition of the layer varies with position through the thickness of the first layer 44. In the latter case, the first layer 44 may be deposited so as to continuously or discontinuously vary the composition through the thickness of the first layer 44. In a most preferred case, the first layer 44 is germanium, in a thickness of from about 11,100 to about 13,600, most preferably about 12,348, Angstroms. The first layer 44 is preferably deposited to have a small tensile internal residual stress.

A second layer 46 and a third layer 48 together serve as a stress-reducing layer structure 49, and also contribute to establishing the optimal effective index of refraction of the coating (as will be discussed subsequently). The second layer 46 is preferably diamond-like carbon, in a thickness of from about 2160 to about 2390, most preferably about 2278 Angstroms. The second layer 46 is preferably deposited to have a small compressive internal residual stress. The third layer 48 may be selected to have any of the compositions discussed previously for the first layer 44, such as, for example, pure germanium, an alloy based upon germanium such as Ge:C, pure silicon, an alloy based upon silicon such as Si:C, or a graded material wherein the composition of the layer varies with position through the thickness of the first layer 44. The third layer 48 is preferably germenium, in a thickness of from about 10,515 to about 11,600, most preferably about 11,068 Anstroms. The third layer 48 is preferably deposited to have a small tensile internal residual stress.

The second layer 46 is formed of diamond-like carbon ("DLC"). This material is deposited as a thin film by chemical vapor deposition, as will be described in greater detail subsequently. It is essentially amorphous carbon having a large fraction of sp3 bonding, and with about 20–30 atomic percent hydrogen in the structure. Diamond-like carbon is harder than carbon ordinarily deposited by chemical vapor deposition, but not as hard as diamond. The deposition and structure of the diamond-like carbon are known in the art, see J. W. Zou, "The deposition and study of hard carbon films", *J.Appl.Phys*, Vol. 65(10), pages 3914–3918 (1989).

A top or fourth layer 50 is the hard layer that is instrumental in preventing damage to the remainder of the coating system 42 and substrate 40. The fourth layer 50 is preferably diamond-like carbon, in a thickness of from about 9,000 to about 11,000 most preferably about 10,010 Angstroms. The fourth layer 50 is preferably deposited to have a small compressive internal residual stress. The diamond-like carbon has a Knoop hardness of 1800–5000, as compared with the hardness of silicon of 1000, germanium of 530, and zinc sulfide of 178. Thus, the diamond-like carbon forms a hard, abrasion-resistant and impact-resistant layer that protects the zinc salt substrate.

The listed materials of the first layer 44 adhere well to the zinc salts of the substrate 40. The listed materials of the first layer 44 and the third layer 48 also adhere well to the diamond-like carbon of the second layer 46 and the fourth layer 50. Thus, the combination of low internal residual stress and good adhesion of the layers to each other leads to an antireflection coating that is adherent to the substrate. Due to the fact that the fourth layer is diamond-like carbon, and the layer is relatively thick, the substrate is well protected against abrasion and impact damage during service.

The first layer 44, second layer 46, and third layer 48 are also selected with regard to optimizing the optical properties of the window. To this end, the effective index of refraction of the combination of the substrate 40, the first layer 44, and the stress-reducing structure 49 (including the second layer 46 and the third layer 48) should be approximately equal to the square of the index of refraction of the fourth layer 50, in order to achieve good wide-band infrared transmission. The index of refraction of each selected infrared-transmissive material is fixed by nature. A single layer coating on a substrate has no freedom for adjusting the relative indices of refraction of the coating and the substrate, and therefore cannot be tailored to achieve wide-bandwidth transmission. A multilayer coating therefore is used in the present invention.

For the case of the window 26, the materials and thicknesses of the substrate 40, the first layer 44, the second layer 46, and the third layer 48 are selected to yield an effective index of refraction that is greater than that of the substrate 40 alone. In the preferred case, the compositions and thicknesses of the layers 44, 46, and 48 are selected to raise the effective index of refraction of the combination of substrate 40 and layers 44, 46, and 48 to about 4. This value is chosen because the index of refraction of the diamond-like carbon fourth layer 50 is about 2. The layers 44, 46, and 48 therefore perform the dual roles of modifying the optical properties of the combination of substrate and layers 44, 46, and 48, and also ensuring adherence of the damage-resistant layer to the substrate 40.

Further pairs of layers can be added to the stress-reducing layer structure 49 between the first layer 44 and the fourth layer 50. These layers are preferably alternating repetitions of the second layer 46 and the third layer 48. Thus, for example, the stress-reducing structure 49 might consist of a total of 100 layers, 50 layers of germanium and 50 layers of diamond-like carbon arranged in an alternating fashion. The additional alternating layers further improve the stress reduction between the fourth layer 50 and the substrate, and protect the substrate. However, the additional layers must be selected so that the overall system meets the optical property requirements as previously discussed.

Figure 3:
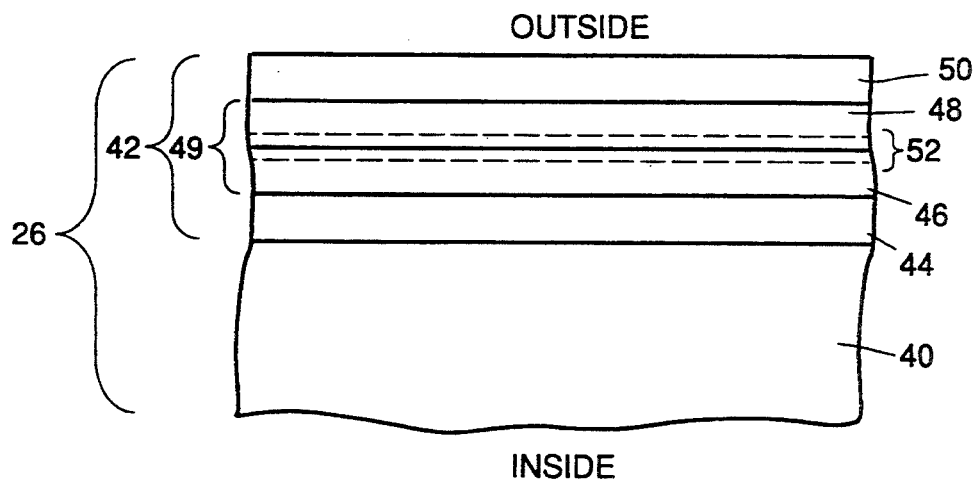
FIG. 3 is a schematic sectional view of a modified window.

To further improve the adhesion between the layers and control the residual stress state, a stress-reducing interlayer region can be provided. FIG. 3 illustrates a stress-reducing interlayer region 52 between the second layer 46 and the third layer 48, which can also be viewed as a blended interface region. The region 52 is preferably made of an alloyed intermixture of codeposited germanium and carbon, indicated as Ge:C. (An alloyed intermixture of codeposited silicon and carbon, indicated as Si:C, can also be used.) This region 52 smoothes the transition in stress state between the two layers 46 and 48. There is no required thickness for the region 52, but it is typically on the order of about 2000 Angstroms thick. This region 52 can also be of a continuous gradation in composition, as discussed previously in relation to the layers 44 and 48.

Figure 4:
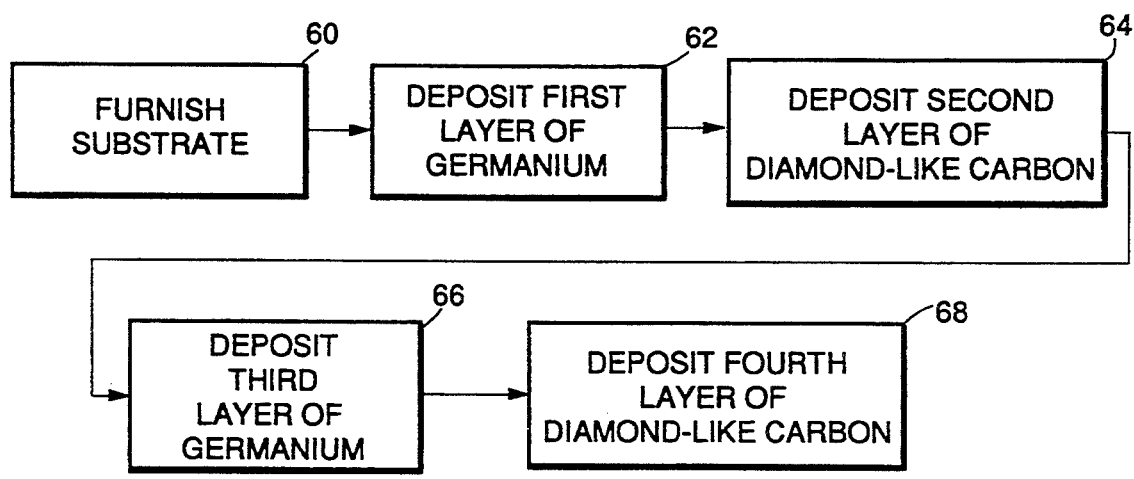
FIG. 4 is a process flow diagram for the preparation of the window of FIG. 2.

FIG. 4 depicts a method for preparing the window 26 of the invention. The substrate 40, preferably a zinc salt as described previously, is first provided in the required shape, numeral 60. For the presently most preferred case wherein the first layer 44 and third layer 48 are germanium, the substrate 40 is placed into a deposition chamber having a magnetron sputter apparatus and also a plasma-activated chemical vapor deposition apparatus therein, so that the layers of the coating system 42 can be deposited without exposing the previously deposited structure to air and handling. The substrate 40 is cleaned by sputtering prior to deposition of the coating structure.

The first layer 44 of germanium is deposited overlying the substrate, numeral 62, in the required thickness and stress state. Deposition of the first layer 62 is preferably by magnetron sputtering from a germanium cathode target, using a pressure of about 5 millitorr argon as the working gas. By operating in this pressure range, the germanium deposits onto the zinc salt with a tensile stress state. The substrate 40 is placed in facing relation to the target and rotated during deposition.

The second layer 46 of diamond-like carbon is deposited by plasma activated chemical vapor deposition, numeral 64, in the required thickness and stress state. The deposition is accomplished from a partial pressure of 10 millitorr methane gas. The methane is dissociated by a plasma discharge, produced by a radio frequency generator operating at 13.56 MHz (megahertz), into positively charged methyl radicals that deposit upon the substrate and prior layers. The substrate and prior layers are maintained at a negative bias of from about 500 to about 1000 volts. The methyl radicals are accelerated toward the deposition surface by this applied voltage, depositing to form the diamond-like carbon layer.

The third layer 48 of germanium is deposited, numeral 66, by the same process as described in relation to step 62, except for the different thicknesses of the layers. The fourth layer 50 of diamond-like carbon is deposited, numeral 68, by the same process as described in relation to step 64, except for the different thickness of the layers.

The selection of silicon or a silicon-based material for the first layer 44 and third layer 48 has the advantage that silicon can be readily deposited by chemical vapor deposition from a silane. Thus, only chemical vapor deposition apparatus is required in the deposition chamber. Moreover, the composition of the first layer 44 and third layer 48 can be readily controlled and/or continuously varied by using a controllable mixture of a silane and methane as the chemical vapor deposition source gas.

Windows were prepared as described for the most preferred approach and comparatively tested against a window comprised of ZnSe, $SiO_x$ and ThF and now in commercial production for LANTIRN-type infrared sensor systems. "LANTIRN" is an acronyl for Low Altitude Night Tactical Infrared Navigation. The average transmittance for the windows in the band from 8-11 micrometers wavelength was 89.8 percent. By comparison, a current production LANTIRN coating has a slightly better average transmittance of about 91 percent.

The two types of window structures were also tested for resistance to damage of various types. The window structure of the invention passed the adherence, hardness, abrasion, 24-hour humidity, 10-day humidity, 24-hour salt fog, and 5-day salt fog tests of MIL-F-48616; the temperature test of MIL-C-48497; a 10 second boiling hydrochloric acid test; and the wiper blade/sand test of DEF-STAN 07-55. By comparison, the production LANTIRN coating described above did not pass the wiper blade test.

The production LANTIRN coating thus has slightly higher transmittance, but does not meet all tests indicative of environmental conditions encountered in service. The present approach is judged to offer a superior combination of transmission and damage resistance to that of the prior approach. The current LANTIRN window is more likely than the present approach to be scarred, scratched, pitted or broken during takeoffs, landing, and low-level flight in sandy areas.

Although a particular embodiment of the invention has been described in detail for purposes of illustration, various modifications may be made without departing from the spirit and scope of the invention. Accordingly, the invention is not to be limited except as by the appended claims.

What is claimed is:
1. An infrared window, comprising:
 a substrate made of a composition including a zinc salt: and
 an antireflection coating system deposition on the substrate, the coating system comprising
  a first layer of germanium overlying the substrate,
  a second layer of diamond-like carbon overlying the first layer,
  a third layer of germanium overlying the second layer, and
  a fourth layer of diamond-like carbon overlying the third layer.
2. The infrared window of claim 1, wherein the zinc salt includes zinc sulfide and zinc selenide.
3. The infrared window of claim 1, wherein the first layer has a thickness of from about 11,100 to about 13,600 Angstroms.
4. The infrared window of claim 1, wherein the second layer has a thickness of from about 2160 to about 2390 Angstroms.
5. The infrared window of claim 1, wherein the third layer has a thickness of from about 10,515 to about 11,600 Angstroms.
6. The infrared window of claim 1, wherein the fourth layer has a thickness of from about 9000 to about 11,000 Angstroms.
7. The infrared window of claim 1, wherein the first layer is in tension, the second layer is in compression, the third layer is in tension, and the fourth layer is in compression.
8. The infrared window of claim 1, further including a stress-reducing interlayer between two of the layers of the coating system.
9. The infrared window of claim 1, further including at least one additional pair of layers between the first layer and the fourth layer, one of the additional pair of layers being germanium and the other being diamond-like carbon.
10. An infrared window, comprising:
a substrate: and
an antireflection coating system deposited on the substrate, the coating system comprising a first layer overlying the substrate, the first layer being made of a material selected from the group consisting of a germanium-including material and a silicon-including material, a second layer of diamond-like carbon overlying the first layer, a third layer overlying the second layer, the third layer being made of a material selected from the group consisting of a germanium-including material and a silicon-including material, and a fourth layer of diamond-like carbon overlying the third layer.

11. The infrared window of claim 10, wherein the substrate is made of a composition that includes a zinc salt.

12. The infrared window of claim 10, wherein at least one of the first layer and the third layer includes germanium.

13. The infrared window of claim 10, wherein at least one of the first layer and the third layer includes silicon.

14. The infrared window of claim 10, wherein at least one of the first layer and the third layer has a graded composition.

15. The infrared window of claim 10, further including at least one additional pair of layers between the first layer and the fourth layer, each additional pair of layers including
a layer made of a material selected from the group consisting of a germanium-including material and a silicon-including material, and
a layer made of diamond-like carbon.

16. An infrared window, comprising:
a substrate transparent to infrared radiation: and
an antireflection coating system deposited on the substrate, the coating system comprising
a base layer that adheres to the substrate, the base layer being transparent to infrared radiation,
a top layer of an abrasion-resistant material that is transparent to infrared radiation, and
infrared-transparent stress-reducing layer structure means intermediate the base layer and the top layer for stress matching the top layer to the base layer and the substrate, the base layer and the stress-reducing layer structure means being selected to obtain an effective index of refraction of the substrate, the base layer, and the stress-reducing layer structure means that is about equal to the square of the index of refraction of the top layer.

17. The infrared window of claim 16, wherein the top layer is diamond-like carbon.

18. The infrared window of claim 1 in which the layers are all deposited in alternating tension and compression.

19. The infrared window of claim 10 in which the layers are all deposited in alternating tension and compression.

20. The infrared window of claim 10 wherein the layers are all deposited sequentially in a single deposition chamber by chemical vapor deposition without exposing the window to air or handling between the depositions.

21. An infrared window as in claim 16 where said infrared-transparent, stress-reducing layer structure means comprises a plurality of layers alternating in compression and tension.

* * * * *